United States Patent
Sivaswamy et al.

(10) Patent No.: US 11,882,232 B2
(45) Date of Patent: Jan. 23, 2024

(54) TIERED AUDIO NOTIFICATIONS BASED ON SURROUNDING CONTEXT

(71) Applicant: International Business Machines Corporation, Armonk, NY (US)

(72) Inventors: Hemant Kumar Sivaswamy, Pune (IN); Vijay Ekambaram, Chennai (IN); Smitkumar Narotambhai Marvaniya, Bangalore (IN); Namit Kabra, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 17/226,613

(22) Filed: Apr. 9, 2021

(65) Prior Publication Data
US 2022/0329684 A1  Oct. 13, 2022

(51) Int. Cl.
| H04W 12/06 | (2021.01) |
| H04M 1/72454 | (2021.01) |
| G06F 40/30 | (2020.01) |
| G10L 17/00 | (2013.01) |
| G06F 3/16 | (2006.01) |
| G06F 40/279 | (2020.01) |

(52) U.S. Cl.
CPC ........ H04M 1/72454 (2021.01); G06F 3/167 (2013.01); G06F 40/279 (2020.01); G06F 40/30 (2020.01); G10L 17/00 (2013.01)

(58) Field of Classification Search
CPC .. H04M 1/72454; G06F 40/279; G06F 40/30; G06F 3/167; G10L 17/00
See application file for complete search history.

(56) References Cited

U.S. PATENT DOCUMENTS

| 8,345,665 B2 | 1/2013 | Vieri et al. |
| 9,747,072 B2 | 8/2017 | Noble et al. |
| 10,264,547 B1 | 4/2019 | Zhong et al. |

(Continued)

FOREIGN PATENT DOCUMENTS

| CA | 3007707 A1 | 12/2019 |
| WO | 2008115553 A1 | 9/2008 |

OTHER PUBLICATIONS

Disclosed Anonymously, "A method and System for Disabling Notification for all incoming communication on a Mobile Device Based on Presence of Ambient Sound," | IP.com No. IPCOM000215117D | IP.com Publication Date: Feb. 20, 2012.

(Continued)

*Primary Examiner* — Moustapha Diaby
(74) *Attorney, Agent, or Firm* — Patterson + Sheridan, LLP (57) ABSTRACT

A method includes determining a presence of one or more people around a user and determining, based on the presence of the one or more people, an exposure level. The method also includes receiving a message for the user, the message comprising a first portion and a second portion and removing, based on the exposure level, the first and second portions from the message to produce a first message. The method further includes removing, based on the exposure level, the first portion from the message to produce a second message and presenting, based on the exposure level, the first message to the user. The method also includes receiving, from the user, feedback about the first message and presenting the second message to the user in response to the feedback.

18 Claims, 5 Drawing Sheets

(56) References Cited

U.S. PATENT DOCUMENTS

| | | | |
|---|---|---|---|
| 10,572,684 | B2 | 2/2020 | LaFever et al. |
| 10,904,174 | B1 | 1/2021 | Thiruvengadam et al. |
| 2009/0070103 | A1 | 3/2009 | Beggelman et al. |
| 2009/0119095 | A1 | 5/2009 | Beggelman et al. |
| 2010/0100546 | A1 | 4/2010 | Kohler |
| 2014/0120961 | A1 | 5/2014 | Buck |
| 2015/0162000 | A1 | 6/2015 | Di Censo et al. |
| 2015/0195406 | A1 | 7/2015 | Dwyer et al. |
| 2016/0260135 | A1 | 9/2016 | Zomet et al. |
| 2017/0063750 | A1 | 3/2017 | Vardhan et al. |
| 2018/0287958 | A1 | 10/2018 | Sukoff et al. |
| 2019/0098125 | A1 | 3/2019 | Adderly et al. |
| 2019/0171693 | A1 | 6/2019 | Dotan-Cohen et al. |
| 2019/0313368 | A1 | 10/2019 | Aggarwal et al. |
| 2021/0006520 | A1 | 1/2021 | Thiruvengadam et al. |
| 2021/0075772 | A1* | 3/2021 | Tew ................... H04L 65/403 |
| 2021/0295831 | A1* | 9/2021 | Okamura ............. G06F 3/0481 |

OTHER PUBLICATIONS

Disclosed Anonymously, "Dynamic Context-Aware Chatbot Interaction Mechanism," | IP.com No. IPCOM000258976D | IP.com Electronic Publication Date: Jun. 29, 2019.

Lee et al., "Exploring Relationship-aware Dynamic Message Screening for Mobile Messengers", UbiComp '18: Proceedings of the 2018 ACM International Joint Conference and 2018 International Symposium on Pervasive and Ubiquitous Computing and Wearable Computers • Oct. 2018 • pp. 134-137 Abstract Only.

Pucihar, K, Coulton, P & Alexander, J 2014, The use of surrounding visual context in handheld AR: device vs. user perspective rendering. in CHI '14 Proceedings of the 32nd annual ACM conference on Human factors in computing systems. Association for Computing Machinery, pp. 197-206.

Quora—"What is the Best Text to Speech Software", Quora 2020. Text to Speech Synthesis "Introduction to TTS" viewed Apr. 8, 2021 http://www.cs.cmu.edu/~srallaba/Learn_Synthesis/intro.html <https://protect-us.mimecast.com/s/YMgsC1wpznSZMAWsYZrsE?domain=cs.cmu.edu>.

* cited by examiner

TIERED AUDIO NOTIFICATIONS BASED ON SURROUNDING CONTEXT

BACKGROUND

The present disclosure relates to audio notifications, and more specifically, to protecting audio notification using surrounding context.

SUMMARY

According to an embodiment, a method includes determining a presence of one or more people around a user and determining, based on the presence of the one or more people, an exposure level. The method also includes receiving a message for the user, the message comprising a first portion and a second portion and removing, based on the exposure level, the first and second portions from the message to produce a first message. The method further includes removing, based on the exposure level, the first portion from the message to produce a second message and presenting, based on the exposure level, the first message to the user. The method also includes receiving, from the user, feedback about the first message and presenting the second message to the user in response to the feedback. Other embodiments include an apparatus for performing this method.

According to another embodiment, a method includes communicating a received message to a server and receiving, from the server, a first message abstracted from the received message based on an exposure level. The exposure level is determined based on a presence of one or more people around a user. The first message includes less information than the received message. The method also includes communicating received feedback about the first message to the server and receiving, from the server, a second message abstracted from the received message based on the exposure level in response to the received feedback. The second abstracted message includes more information than the first message.

DETAILED DESCRIPTION

When a user receives a notification, a device of the user may present the notification to the user audibly. For example, the user's phone or speaker may speak or read the notification to the user. The user's privacy, however, is put at risk if the notification is read indiscriminately. For example, if the user is in a public space or if the user has visitors over, then people other than the user may hear the notification being read or spoken, potentially exposing personal information of the user.

This disclosure describes a system that monitors a user's surrounding context to determine the people who are around the user. When a notification is received, the system analyzes the notification and the user's surrounding context to determine what types of information from the notification can be presented audibly and what types of information from the notification should not be presented audibly. The system then generates multiple levels of abstracted messages based on the notification. Each abstracted message exposes different amounts of information from the notification. The system then selects one of the abstracted messages based on the user's surrounding context. The system speaks or reads the abstracted message. The user may provide feedback to request that more or less information be presented. In response, the system speaks or reads another abstracted message that includes more or less information. In this manner, the system protects the user's privacy and sensitive information, in particular embodiments.

Figure 1:
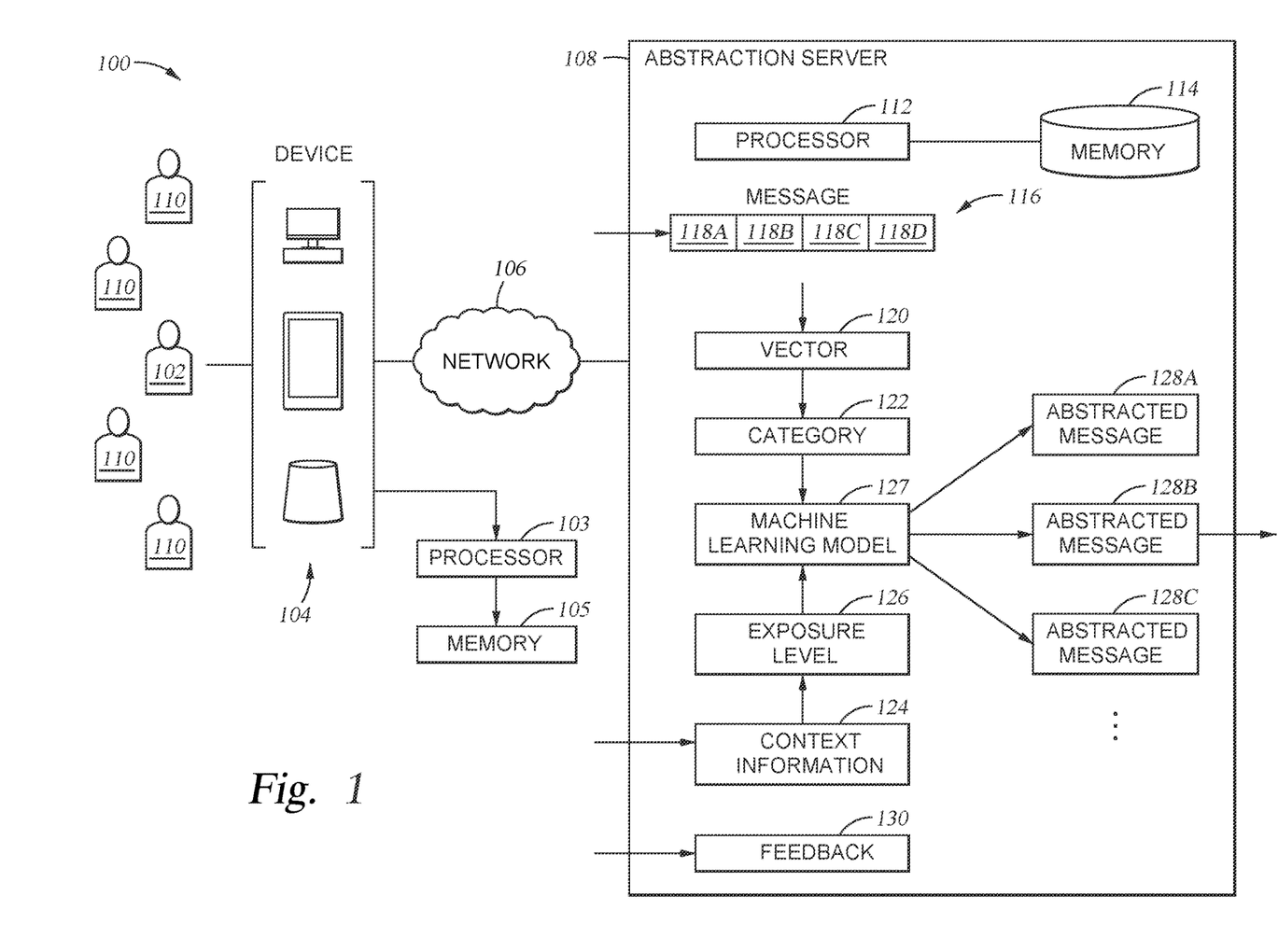
FIG. 1 illustrates an example system.

FIG. 1 illustrates an example system 100. As seen in FIG. 1, the system 100 includes one or more devices 104, a network 106, and an abstraction server 108. Generally, the abstraction server 108 generates multiple abstracted messages based on a notification message. The abstracted messages present different amounts of information from the notification message. The abstraction server 108 selects one of the abstracted messages based on a detected context of the one or more devices 104. The selected message may then be presented (e.g., spoken or read). In particular embodiments, the system 100 protects the personal information of a user 102 from being exposed to others.

A user 102 uses the one or more devices 104 to receive notification messages. The user 102 receives a notification from the device 104 when a particular event happens. For example, the device 104 may generate a notification when the device 104 receives a communication, such as an email message or text message. As another example, the device 104 may generate a notification when the device 104 receives a telephone call or video call. Conventionally, one or more of the devices 104 (e.g., a smart phone or smart speaker) speak or read the notification message when the notification message is generated. By speaking or reading the notification message, the user 102 is alerted of the event even if the user 102 is not viewing a screen of the device 104. If the notification message contains the user's 102 personal information, however speaking or reading the notification message exposes the user's 102 personal information to others around the user 102. Additionally, even if the notification message does not contain personal information, the user 102 may still not wish for certain information in the notification message to be heard by others. In these situations, the user 102 may prefer that a more generic notification be generated and spoken instead.

The device 104 includes any suitable device for communicating with components of the system 100 over the network 106. As an example and not by way of limitation, the device 104 may be a computer, a laptop, a wireless or cellular telephone, an electronic notebook, a personal digital assistant, a tablet, a speaker, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102. The device 104 includes a hardware processor 103, memory 105, or circuitry configured to perform any of the functions or actions of the device 104 described herein. For example, a software application designed using software code may be stored in the memory and executed by the processor to perform the functions of the device 104.

The processor 103 is any electronic circuitry, including, but not limited to microprocessors, application specific integrated circuits (ASIC), application specific instruction set processor (ASIP), and/or state machines, that communicatively couples to memory 105 and controls the operation of the device 104. The processor 103 may be 8-bit, 16-bit, 32-bit, 64-bit or of any other suitable architecture. The processor 103 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 103 may include other hardware that operates software to control and process information. The processor 103 executes software stored on memory to perform any of the functions described herein. The processor 103 controls the operation and administration of the device 104 by processing information (e.g., information received from the devices 104, network 106, and memory 105). The processor 103 may be a programmable logic device, a microcontroller, a microprocessor, any suitable processing device, or any suitable combination of the preceding. The processor 103 is not limited to a single processing device and may encompass multiple processing devices.

The memory 105 may store, either permanently or temporarily, data, operational software, or other information for the processor 103. The memory 105 may include any one or a combination of volatile or non-volatile local or remote devices suitable for storing information. For example, the memory 105 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 105, a disk, a CD, or a flash drive. In particular embodiments, the software may include an application executable by the processor 103 to perform one or more of the functions described herein.

The network 106 is any suitable network operable to facilitate communication between the components of the system 100. The network 106 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The abstraction server 108 determines a context surrounding the user 102 or the device 104 and determines what information from a notification message should be presented based on that context. The abstraction server 108 generates various abstracted messages that include different amounts of information from the notification message. The abstraction server 108 then selects one of the abstracted messages to be spoken or read based on the context around the user 102 or the device 104. In this manner, the abstraction server 108 protects certain information, such as the personal information of the user 102, from being exposed to others around the user 102, in particular embodiments. As seen in FIG. 1, the abstraction server 108 includes a processor 112 and a memory 114, which are configured to perform the functions or actions of the abstraction server 108 described herein.

The processor 112 is any electronic circuitry, including, but not limited to microprocessors, application specific integrated circuits (ASIC), application specific instruction set processor (ASIP), and/or state machines, that communicatively couples to memory 114 and controls the operation of the abstraction server 108. The processor 112 may be 8-bit, 16-bit, 32-bit, 64-bit or of any other suitable architecture. The processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 112 may include other hardware that operates software to control and process information. The processor 112 executes software stored on memory to perform any of the functions described herein. The processor 112 controls the operation and administration of the abstraction server 108 by processing information (e.g., information received from the devices 104, network 106, and memory 114). The processor 112 may be a programmable logic device, a microcontroller, a microprocessor, any suitable processing device, or any suitable combination of the preceding. The processor 112 is not limited to a single processing device and may encompass multiple processing devices.

The memory 114 may store, either permanently or temporarily, data, operational software, or other information for the processor 112. The memory 114 may include any one or a combination of volatile or non-volatile local or remote devices suitable for storing information. For example, the memory 114 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 114, a disk, a CD, or a flash drive. In particular embodiments, the software may include an application executable by the processor 112 to perform one or more of the functions described herein.

The abstraction server 108 receives a message 116, which may be a notification message generated by the one or more devices 104. The one or more devices 104 communicate the message 116 to the abstraction server 108 without speaking or reading the message 116. The message 116 includes one or more portions 118. Each portion 118 includes certain words within the message 116. In the example of FIG. 1, the message 116 includes four portions 118A, 118B, 118B, and 118D. The abstraction server 108 processes the portions 118 of the message 116 to determine certain characteristics of the message 116.

For example, the abstraction server 108 analyzes the words within the portions 118 of the message 116 to generate one or more vectors 120 representing the message 116. The one or more vectors 120 include numerical values that represent the words within the message 116, the ordering of the words in the message 116, or the meaning of the message 116. The abstraction server 108 then analyzes the one or more vectors 120 to determine a meaning or category 122 for the message 116. For example, the abstraction server 108 may compare the one or more vectors 120 with other vectors to determine which of the other vectors are closest to the one or more vectors 120. The abstraction server 108 then predicts the meaning or category 122 of the message 116 based on the meaning or category of the other vectors that are closest to the one or more vectors 120. In some instances, the abstraction server 108 may determine the meaning or category 122 of the message 116 by clustering the one or more vectors 120. The abstraction server 108 then predicts the meaning or category 122 of the message 116 based on characteristics of the cluster. The meaning or category 122 may indicate the type of information within the message 116 including personal information of the user 102.

The abstraction server 108 also determines a context around the user 102 or the device 104. For example, the abstraction server 108 receives context information 124 from the one or more devices 104. The context information 124 may reveal the presence of other people 110 around the user 102 or the device 104. For example, the context information 124 may include words spoken by other people 110 that were detected by a microphone of the one or more devices 104. As another example, the context information 124 may include words spoken by other people 110 on a call occurring on the device 104. The abstraction server 108 analyzes the context information 124 to identify the people 110. For example, the abstraction server 108 may analyze audio signals within the context information 124 to determine which people 110 are around the user 102 or the device 104. For example, the abstraction server 108 may compare the audio signals within the context information 124 with previously recorded voice samples to identify the people 110. The abstraction server 108 then determines, based on these comparisons, the identity of the people 110 who produced the audio signals within the context information 124. As another example, the context information 124 may include screenshots that include the faces of the people 110 during a video call on the device 104. The abstraction server 108 may compare the screenshots with pictures of the people 110 to identify the people 110.

Based on the identity of the people 110 around the user 102 or the device 104, the abstraction server 108 determines an exposure level 126. The exposure level 126 indicates a level of privacy that the user 102 expects around the identified people 110. For example, if the abstraction server 108 determines that the user 102 is around strangers, then the abstraction server 108 may determine an exposure level 126 that indicates a high level of privacy is expected. As another example, if the abstraction server 108 determines that the user 102 is around close family members, the abstraction server 108 may determine an exposure level 126 that indicates a lower level of privacy is expected. The user 102 may specify the level of privacy expected around certain people 110.

The abstraction server 108 uses a machine learning model 127 to generate one or more abstracted messages 128 based on the message 116. The abstracted messages 128 include different amounts of information from the message 116. Thus, each abstracted message 118 presents a different level of exposure of the information within the message 116. The abstraction server 108 may generate the various abstracted messages 128 by removing, replacing, or changing one or more portions 118 of the message 116. The abstraction server 108 may determine which portions 118 of the message 116 should be removed or changed based on the determined meaning or category 122 of the message 116. For example, if the category 122 concerns pay or salary, the abstraction server 108 may determine that numbers (e.g., salary numbers) should be removed from the message 116 or that words like "pay" or "salary" may be removed or replaced with more generic words such as "a deposit was received."

In the example of FIG. 1, the abstraction server 108 generates abstracted messages 128A, 128B, and 128C. The abstraction server 108 may generate the abstracted message 128A by removing or replacing the portions 118A, 118B, and 118C of the message 116. The abstraction server 108 may generate the abstracted message 128B by replacing or removing the portions 118A and 118B of the message 116. The abstraction server 108 may generate the abstracted message 128C by replacing or removing the portion 118A of the message 116. In this manner, the abstracted message 128A exposes the least amount of information from the message 116. The abstracted message 128B exposes a medium amount of information within the message 116. The abstracted message 128C exposes the most information within the message 116. Thus, the abstracted messages 128A, 128B, and 128C expose different amounts of information within the message 116.

The abstraction server 108 then selects an abstracted message 128 to communicate back to the device 104 based on the exposure level 126. The abstraction server 108 may use the machine learning model 127 to select the abstracted message 128 to communicate back to the device 104. The machine learning model 127 uses the exposure level 126 to select the abstracted message 128. Using the example of FIG. 1, if the exposure level 126 indicates that a high level of privacy is expected, then the machine learning model 127 may select the abstracted message 128A to communicate back to the device 104. Alternatively, if the exposure level 126 indicates that a low level of privacy is expected, then the machine learning model 127 may select the abstracted message 128C to communicate back to the device 104. The device 104 may speak or read the selected abstracted message 128. In this manner, the device 104 does not speak or read all the information within the message 116, which protects the privacy of the user 102, in particular embodiments.

The user 102 may provide feedback 130 about the selected abstracted message 128. For example, the user 102 may determine that the selected abstracted message 128 hid or removed too much of the information from the message 116. In response, the user 102 may provide feedback 130 that requests additional information from the message 116. The user 102 may make an audible request for additional information. The device 104 communicates the feedback 130 to the abstraction server 108. As another example, the user 102 may determine that the selected abstracted message 128 included too much information from the message 116. In response, the user 102 may provide feedback 130 that requests less information from the message 116.

The abstraction server 108 receives the feedback 130 and determines a subsequent action. For example, if the feedback 130 requests that additional information be presented then the abstraction server 108 communicates another abstracted message 128 to the device 104. Using the example of FIG. 1, if the abstraction server 108 initially communicated the abstracted message 128A, which hid much of the information within the message 116, then the feedback 130 may request additional information. In response, the abstraction server 108 communicates the abstracted message 128B, which has less information from the message 116 hidden or removed. The device 104 then speaks or reads the abstracted message 128B to present additional information to the user 102. As another example, if the abstraction server 108 initially communicated the abstracted message 128C, which has little information from the message 116 hidden or removed, then the user 102 may provide feedback 130 that requests less information. In response, the abstraction server 108 communicates the abstracted message 128B, which has more information from the message 116 hidden or removed.

In certain embodiments, the abstraction server 108 adjusts the exposure level 126 based on the feedback 130. For example, if the feedback 130 requests additional information, then the abstraction server 108 changes the exposure level 126 to train the machine learning model 127 to provide additional information in the future for the same context information 124. As another example, if the feedback 130 requests less information, then the abstraction server 108 changes the exposure level 126 to train the machine learning model 127 to provide less information for the same context information 124 in the future.

As an example, the abstraction server 108 may receive a message 116 indicating that the user 102 has received an email that the user's 102 salary of $5,000 has been deposited in the user's 102 bank account. The abstraction server 108 may analyze the message 116 to determine the one or more vectors 120 and the meaning or category 122. For example, the abstraction server 108 may determine that the message 116 is in a pay or salary category 122. The abstraction server 108 may also determine, based on audio signals detected by a microphone of the device 104, that the user 102 is around a group of friends. The abstraction server 108 then determines an exposure level 126 that indicates that a medium level of privacy is expected. The abstraction server 108 then uses the machine learning model 127 to generate a number of abstracted messages 128. Each abstracted message 128 may have certain amounts of information removed from the message 116 to provide different amounts of exposure. For example, the abstracted message 128A may indicate that the user 102 has received an email about his company. The abstracted message 128B may indicate that the user 102 has received his salary. The abstracted message 128C may indicate that the user's salary has been direct deposited into his bank account. The machine learning model 127 then selects the abstracted message 128B based on the exposure level 126 and communicates the abstracted message 128B to the user 102. The device 104 then speaks or reads the abstracted message 128B, which announces that the user has received an email about his salary. The user 102 may then provide feedback 130 requesting additional or less information. If the user requests additional information, the machine learning model 127 may select the abstracted message 128C and communicate the abstracted message 128C to the device 104. If the user 102 requests less information, the machine learning model 127 may select the abstracted message 128A and communicate the abstracted message 128A to the device 104. The device 104 may then speak or read the abstracted message 128A or the abstracted message 128C. In this manner, the abstraction server 108 protects the payment or salary information of the user 102 based on the people 110 who are around the user 102.

As another example, the abstraction server 108 may receive a message 116 indicating that the user 102 is receiving a telephone call from his doctor. The abstraction server 108 may analyze the message 116 to determine the one or more vectors 120 and the meaning or category 122. For example, the abstraction server 108 may determine that the message 116 is in a health category 122. The abstraction server 108 may also determine, based on audio signals detected by a microphone of the device 104, that the user 102 is around a group of strangers. The abstraction server 108 then determines an exposure level 126 that indicates that a high level of privacy is expected. The abstraction server 108 then uses the machine learning model 127 to generate a number of abstracted messages 128. Each abstracted message 128 may have certain amounts of information removed from the message 116 to provide different amounts of exposure. For example, the abstracted message 128A may indicate that the user 102 is receiving a call. The abstracted message 128B may indicate that the user 102 is receiving a call about health. The abstracted message 128C may indicate that the user 102 is receiving a call from his doctor. The machine learning model 127 then selects the abstracted message 128A based on the exposure level 126 and communicates the abstracted message 128A to the user 102. The device 104 then speaks or reads the abstracted message 128A, which announces that the user is receiving a call. The user 102 may then provide feedback 130 requesting additional information. In response, the machine learning model 127 may select the abstracted message 128B and communicate the abstracted message 128B to the device 104. The device 104 may then speak or read the abstracted message 128B. In this manner, the abstraction server 108 protects the health information of the user 102 based on the people 110 who are around the user 102.

Figure 2:
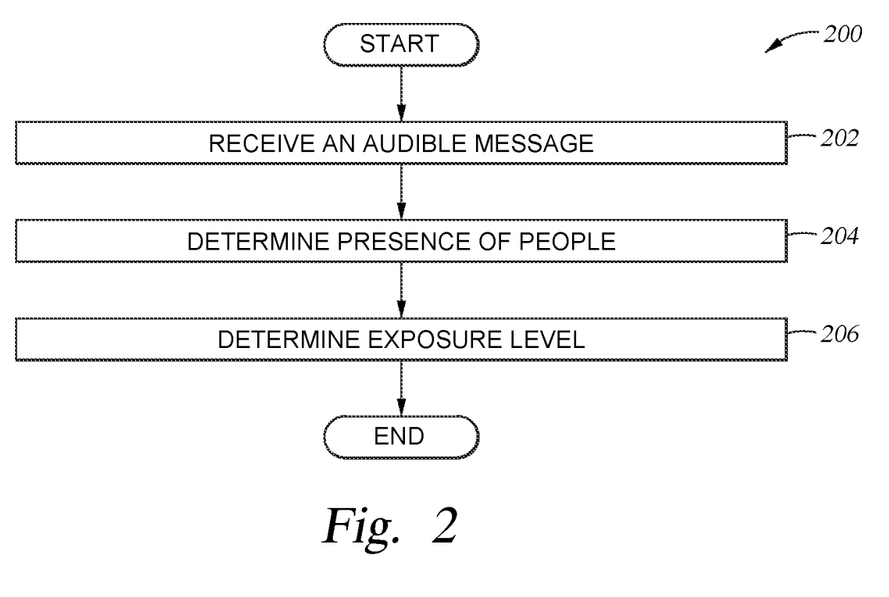
FIG. 2 is a flowchart of an example method in the system of FIG. 1.

FIG. 2 is a flowchart of an example method 200 in the system 100 of FIG. 1. The abstraction server 108 performs the method 200. In particular embodiments, by performing the method 200, the abstraction server 108 determines a context surrounding a user 102 or a device 104.

In block 202, the abstraction server 108 receives an audible message. The audible message may include words spoken by people 110 around a user 102 or a device 104. For example, the audible message may include words spoken by people 110 on a call occurring on the device 104. The abstraction server 108 analyzes the information within the audible message to identify the people 110 around the user 102 or the device 104. For example, the abstraction server 108 may compare audio signals within the message to prerecorded audio samples of various people to determine whether the audio signals within the message match the voices in the prerecorded audio samples. Based on determined matches, the abstraction server 108 determines the identities of the people 110 to be the identities of the speakers in the prerecorded audio samples. In block 204, the abstraction server 108 determines the presence of the people 110 based on the audible message. The abstraction server 108 may determine the type of people 110 around the user 102 (e.g., friends, family, strangers etc.).

In block 206, the abstraction server 108 determines an exposure level 126 based on the people 110 around the user 102 or the device 104. The exposure level 126 indicates a level of privacy expected by the user 102. For example, if the abstraction server 108 determines that the user 102 is around strangers then the abstraction server 108 may determine that a high level of privacy is expected. As another example, if the abstraction server 108 determines that the user 102 is around friends or family, then the abstraction server 108 may determine that a medium level of privacy is expected. The abstraction server 108 uses the exposure level 126 to select an appropriate abstracted message 128 to communicate to the user 102.

Figure 3:
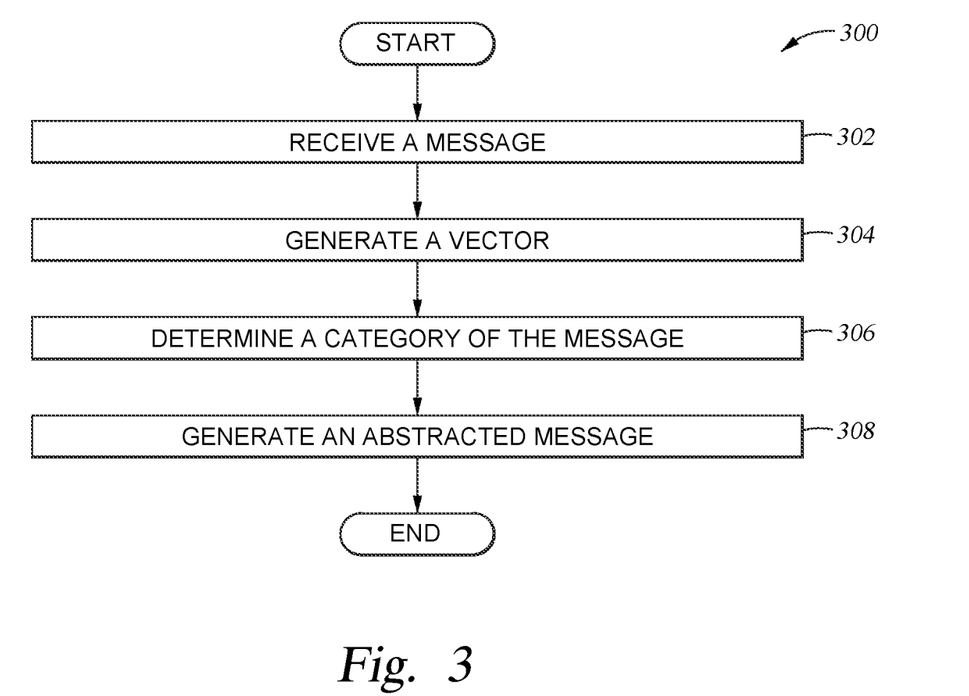
FIG. 3 is a flowchart of an example method in the system of FIG. 1.

FIG. 3 is a flowchart of an example method 300 in the system 100 of FIG. 1. The abstraction server 108 performs the method 300. In particular embodiments, by performing the method 300, the abstraction server 108 generates abstracted messages 128 with different amounts of information hidden or removed.

In block 302, the abstraction server 108 receives a message 116, which may be a notification message generated by the device 104 in response to an event. For example, the notification message 116 may indicate that a particular email message or text message has been received by the device 104. As another example, the message 116 may indicate that the device 104 is receiving a call. The message 116 may include one or more portions 118. The abstraction server 108 analyzes the message 116 and the portions 118 to determine a category 122 for the message 116.

In block 304, the abstraction server 108 generates a vector 120, which may be a numerical representation of the words within the message 116. For example, the numerical representation may identify the words within the message 116, the ordering of the words of the message 116, and the meaning of the words in the message 116. The abstraction server 108 analyzes the vector 120 to determine a category 122 of the message 116 in block 306. The category 122 indicates a meaning or a subject of the message 116 and may indicate an amount of personal information within the message 116.

In block 308, the abstraction server 108 generates an abstracted message 128. In certain embodiments, the abstraction server 108 generates multiple abstracted messages 128. Each abstracted message 128 has a different amount of information from the message 116 removed or hidden. In this manner, each abstracted message 128 presents a different level of privacy. The more private an abstracted message 128 is, the more information from the message 116 that the abstracted message 128 hides. In certain embodiments, the abstraction server 108 determines the information to be removed from the message 116 to generate the abstracted messages 128 based on the category 122. For example, if the category 122 concerns pay or salary, the abstraction server 108 may determine that numbers (e.g., salary numbers) should be removed from the message 116 or that words like "pay" or "salary" may be removed or replaced with more generic words such as "a deposit was received." The abstraction server 108 may select an abstracted message 128 to communicate to the device 104 based on the exposure level 126.

Figure 4:
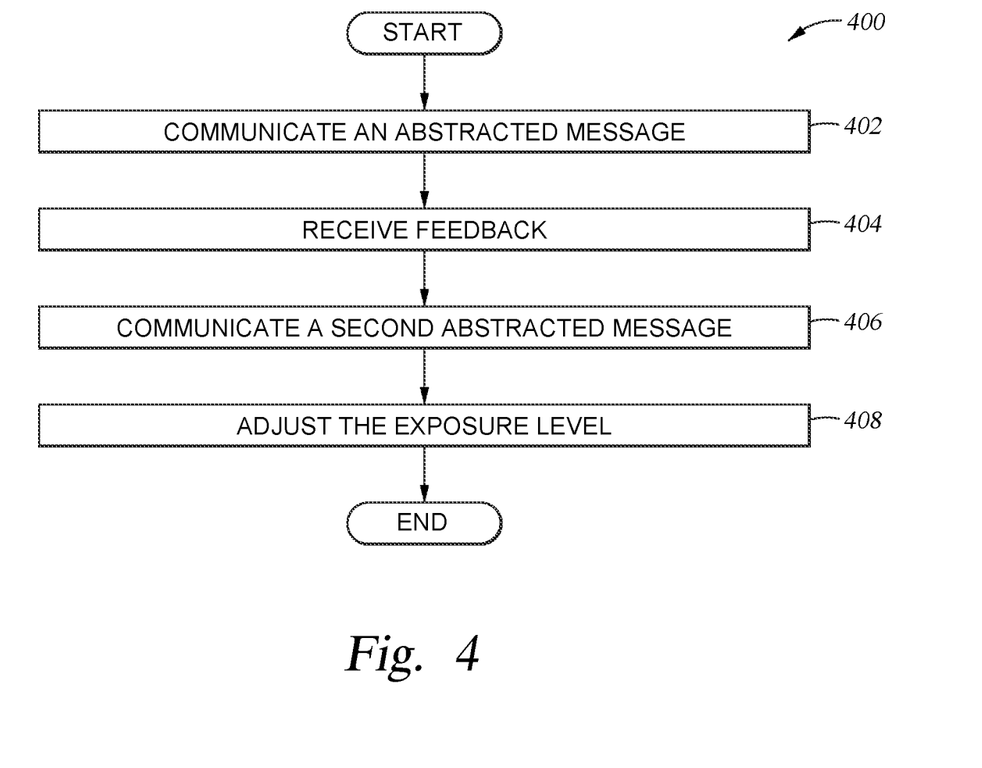
FIG. 4 is a flowchart of an example method in the system of FIG. 1.

FIG. 4 is a flowchart of an example method 400 in the system 100 of FIG. 1. The abstraction server 108 performs the method 400. In particular embodiments, by performing the method 400, the abstraction server 108 communicates different abstracted messages 128 to the device 104, which protects the privacy of the user 102.

The abstraction server 108 communicates an abstracted message 128 in block 402. The abstraction server 108 may have selected the abstracted message 128 based on the exposure level 126. For example, the exposure level 126 may indicate that the user 102 expects a certain level of privacy based on the people 110 around the user 102. The abstraction server 108 may select the abstracted message 128 based on the expected level of privacy. When the device 104 receives the abstracted message 128, the device 104 reads or speaks the abstracted message 128.

After the user 102 hears the abstracted message 128, the user 102 may provide feedback 130. For example, the user 102 may make an audible request for more or less information. The abstraction server 108 receives the feedback 130 in block 404. The abstraction server 108 processes the feedback 130 to select another abstracted message 128 to communicate to the device 104.

In block 406, the abstraction server 108 communicates a second abstracted message 128 to the device 104. The second abstracted message 128 may include more or less information than the originally communicated abstracted message 128. If the user 102 requested additional information in the feedback 130, then the abstraction server 108 may communicate a second abstracted message 128 that has less information from the message 116 hidden or removed. If the user 102 requests less information in the feedback 130, then the abstraction server 108 communicates a second abstraction message 128 that has more information from the message 116 hidden or removed. When the device 104 receives the second abstracted message 106 the device 104 speaks or reads the second abstracted message 128.

In block 408, the abstraction server 108 adjusts the exposure level 126 based on the feedback 130. For example, if the user 102 requests additional information in the feedback 130, then the abstraction server 108 may adjust the exposure level 126 to provide additional information for the same context information 124 in the future. As another example, if the user 102 requests less information in the feedback 130, then the abstraction server 108 adjusts the exposure level 126 to provide less information for the same context information 124 in the future.

Figure 5:
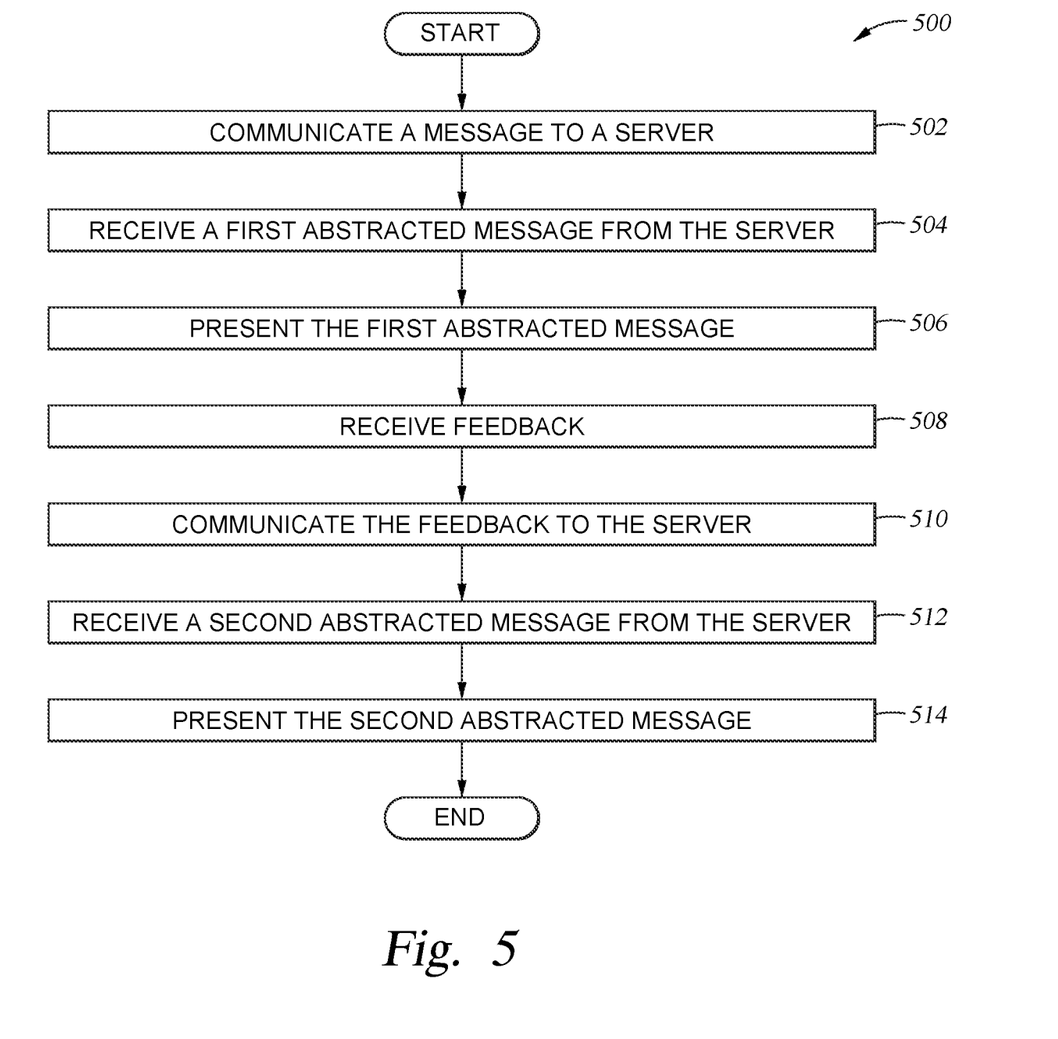
FIG. 5 is a flowchart of an example method in the system of FIG. 1.

FIG. 5 is a flowchart of an example method 500 in the system 100 of FIG. 1. A device 104 performs the method 500. In particular embodiments, by performing the method 500, the device 104 protects certain information of a user 102 from being exposed to people 110 around the user 102.

In block 502, the device 104 communicates a message 116 to a server 108. The message 116 may be a notification message generated by the device 104. The device 104 may have generated the message 116 in response to a particular event occurring on the device 104. For example, the message 116 may indicate that the device 104 has received an email message or a text message. As another example, the message 116 may indicate that the device 104 has received a call.

In block 504, the device 104 receives a first abstracted message 128 from the server 108. The first abstracted message 128 may have a certain amount of information from the message 116 hidden or removed. The server 108 may have hidden or removed this information based on detecting the presence of certain people 110 around the user 102 or the device 104. In block 506, the device 104 presents the first abstracted message 128. For example, the device 104 may speak or read the first abstracted message 128 to the user 102.

In block 508, the device 104 receives feedback 130. For example, the user 102 may speak the feedback 130, which may include a request for more or less information. In block 510, the device 104 communicates the feedback 130 to the server 108. The server 108 may analyze the feedback 130 and respond with a second abstracted message 128.

In block 512, the device 104 receives the second abstracted message 128 from the server 108. The second abstracted message 128 may include more or less information depending on the feedback 130 provided by the user 102. In block 514, the device 104 presents the second abstracted message 128 to the user 102. For example, the device 104 may speak or read the second abstracted message 128 to the user 102.

In summary, a system 100 monitors a user's 102 surrounding context to determine the people 110 who are around the user 102. When a notification is received, the system 100 analyzes the notification and the user's 102 surrounding context to determine what types of information from the notification can be presented audibly and what types of information from the notification should not be presented audibly. The system 100 then generates multiple levels of abstracted messages 128 based on the notification. Each abstracted message 128 exposes different amounts of information from the notification. The system 100 then selects one of the abstracted messages 128 based on the user's 102 surrounding context. The system 100 speaks or reads the abstracted message 128. The user 102 may provide feedback 130 to request that more or less information be presented. In response, the system 100 speaks or reads another abstracted message 128 that includes more or less information. In this manner, the system 100 protects the user's 102 privacy and sensitive information, in particular embodiments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., the abstraction server 108) or related data available in the cloud. For example, the abstraction server 108 could execute on a computing system in the cloud and determine the context around a user 102 and generate abstracted messages 128. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A method comprising:
   determining a presence of one or more people around a user;
   determining, based on the presence of the one or more people, an exposure level;
   receiving a message for the user, the message comprising a first portion and a second portion;
   removing, based on the exposure level, the first and second portions from the message to produce a first message;
   removing, based on the exposure level, the first portion from the message to produce a second message;
   presenting, based on the exposure level, the first message to the user;
   receiving, from the user, feedback about the first message;
   adjusting the exposure level based on the feedback; and
   presenting the second message to the user in response to the feedback.

2. The method of claim 1, further comprising analyzing words of the message to determine a category of the message, wherein removing the first and second portions from the message to produce the first message is further based on the category, and wherein removing the first portion from the message to produce the second message is further based on the category.

3. The method of claim 2, wherein analyzing the words of the message comprises generating a vector based on the first and second portions.

4. The method of claim 1, wherein the feedback requests that additional information in the message be provided.

5. The method of claim 1, wherein the first message and the second message are presented audibly.

6. The method of claim 1, further comprising:
   receiving an audible message spoken by the one or more people; and
   identifying the one or more people based on the audible message.

7. An apparatus comprising:
   a memory; and
   a hardware processor communicatively coupled to the memory, the hardware processor configured to:
   determine a presence of one or more people around a user;
   determine, based on the presence of the one or more people, an exposure level;

receiving a message for the user, the message comprising a first portion and a second portion;

remove, based on the exposure level, the first and second portions from the message to produce a first message;

remove, based on the exposure level, the first portion from the message to produce a second message;

present, based on the exposure level, the first message to the user;

receive, from the user, feedback about the first message;

adjust the exposure level based on the feedback; and present the second message to the user in response to the feedback.

8. The apparatus of claim 7, wherein the hardware processor is further configured to analyze words of the message to determine a category of the message, wherein removing the first and second portions from the message to produce the first message is further based on the category, and wherein removing the first portion from the message to produce the second message is further based on the category.

9. The apparatus of claim 8, wherein analyzing the words of the message comprises generating a vector based on the first and second portions.

10. The apparatus of claim 7, wherein the feedback requests that additional information in the message be provided.

11. The apparatus of claim 7, wherein the first message and the second message are presented audibly.

12. The apparatus of claim 7, wherein the hardware processor is further configured to:

receive an audible message spoken by the one or more people; and identify the one or more people based on the audible message.

13. A method comprising:

communicating a received message to a server;

receiving, from the server, a first message abstracted from the received message based on an exposure level, wherein the exposure level is determined based on a presence of one or more people around a user, and wherein the first message includes less information than the received message;

communicating received feedback about the first message to the server;

adjusting the exposure level based on the feedback; and receiving, from the server, a second message abstracted from the received message based on the exposure level in response to the received feedback, wherein the second message includes more information than the first message.

14. The method of claim 13, wherein words of the received message are analyzed to determine a category of the received message.

15. The method of claim 14, wherein analyzing the words of the received message comprises generating a vector based on the received message.

16. The method of claim 13, wherein the feedback requests that additional information in the received message be provided.

17. The method of claim 13, further comprising presenting the first message and the second message audibly.

18. The method of claim 13, further comprising communicating, to the server, a received audible message spoken by the one or more people, wherein the one or more people are identified based on the received audible message.

* * * * *